United States Patent [19]
Slatter

[11] Patent Number: 5,921,196
[45] Date of Patent: Jul. 13, 1999

[54] SPORT FISHING OUTRIGGER APPARATUS

[75] Inventor: Stephen O. Slatter, 14501 SW. 63rd Court, Miami, Fla. 33158

[73] Assignees: Stephen O. Slatter; Donna J. Slatter, both of Miami, Fla.

[21] Appl. No.: 08/852,222

[22] Filed: May 7, 1997

[51] Int. Cl.⁶ .......................... B63B 35/14; A01K 87/00
[52] U.S. Cl. .......................... 114/255; 43/27.4; 114/364; 248/514; 248/535; 403/109.3
[58] Field of Search ...................... 114/255, 364; 43/21.2, 27.4; 248/511, 514, 535, 538; 403/109.3

[56] References Cited

U.S. PATENT DOCUMENTS

| | | |
|---|---|---|
| 1,007,322 | 10/1911 | Barnes . |
| 1,801,014 | 4/1931 | Lange et al. . |
| 2,229,473 | 1/1941 | Redmer . |
| 2,273,791 | 2/1942 | Wirgen . |
| 2,427,841 | 9/1947 | Dichter . |
| 2,517,700 | 8/1950 | Odin . |
| 2,800,737 | 7/1957 | Crossan . |
| 2,921,763 | 1/1960 | Millter et al. . |
| 2,957,187 | 10/1960 | Raia . |
| 3,063,668 | 11/1962 | Yohe . |
| 3,103,375 | 9/1963 | McMullin . |
| 3,161,390 | 12/1964 | Larson ..................................... 43/21.2 |
| 3,190,594 | 6/1965 | Chion ..................................... 43/21.2 |
| 3,411,519 | 11/1968 | Weber . |
| 3,964,706 | 6/1976 | Adams . |
| 3,968,587 | 7/1976 | Kammeraad . |
| 3,980,409 | 9/1976 | Turner ..................................... 403/108 |
| 4,004,539 | 1/1977 | Wesson . |
| 4,621,431 | 11/1986 | Fatool et al. . |
| 4,836,127 | 6/1989 | Wille . |
| 4,993,346 | 2/1991 | Rupp . |
| 5,261,434 | 11/1993 | Fodero . |
| 5,301,451 | 4/1994 | VanAssche . |
| 5,445,102 | 8/1995 | Rupp ..................................... 43/27.4 |
| 5,458,305 | 10/1995 | Woodward . |
| 5,519,959 | 5/1996 | Cross . |
| 5,592,893 | 1/1997 | Jordan, III et al. . |
| 5,598,598 | 2/1997 | Sorenson . |
| 5,778,592 | 7/1998 | Malmberg ..................................... 43/21.2 |

OTHER PUBLICATIONS

"Let's Go Boating", 1988, M&E Marine Supply Company, pp. 146 and 147.
*Overton's*, p. 23, Jan. 1992.
*Lee's*, pp. 174–175, Jan. 1994.
*Boat Show Buyer's Guide*, p. 89, Jan. 1996.
*Boat Show Buyer's Guide*, pp. 85,91, Jan. 1997.

*Primary Examiner*—Sherman Basinger
*Attorney, Agent, or Firm*—Allen, Dyer, Doppelt, Milbrath & Gilchrist, P.A.

[57] ABSTRACT

An outrigger assembly includes a mounting base for mounting to the gunwale of a sport fishing boat. The mounting base plate and a sleeve extend from the plate for receiving an outrigger pole holder. The outrigger pole holder includes an arcuate tube rotatably journaled within the mounting base sleeve. The arcuate tube has an upper end portion extending outward of the sleeve for receiving an outrigger pole and a lower end portion of the arcuate tube has a nut for removably coupling with the mounting base socket. Once a desirable orientation is selected, engaging the hex-nut into the hex-nut socket prevents rotation of the pole holder. The outrigger pole includes a plurality of elongated tubular sections of successively smaller cross-section telescopingly joined to form the outrigger pole for adjusting the outrigger pole between a retracted position and a fully extended position. A spring lock assembly includes a locking button biased radially outward through a hole within the elongated tubular sections. Each elongated tubular section has a second hole positioned within an opposing end of each elongated tubular section for receiving the locking button therethrough when the outrigger pole is in the fully extended position. A stop assembly cooperates with the spring lock assembly for limiting the extended position such that the holes within each of the elongated tubular sections are positioned for receiving the locking button therethrough when the outrigger pole is in the fully extended position.

53 Claims, 12 Drawing Sheets

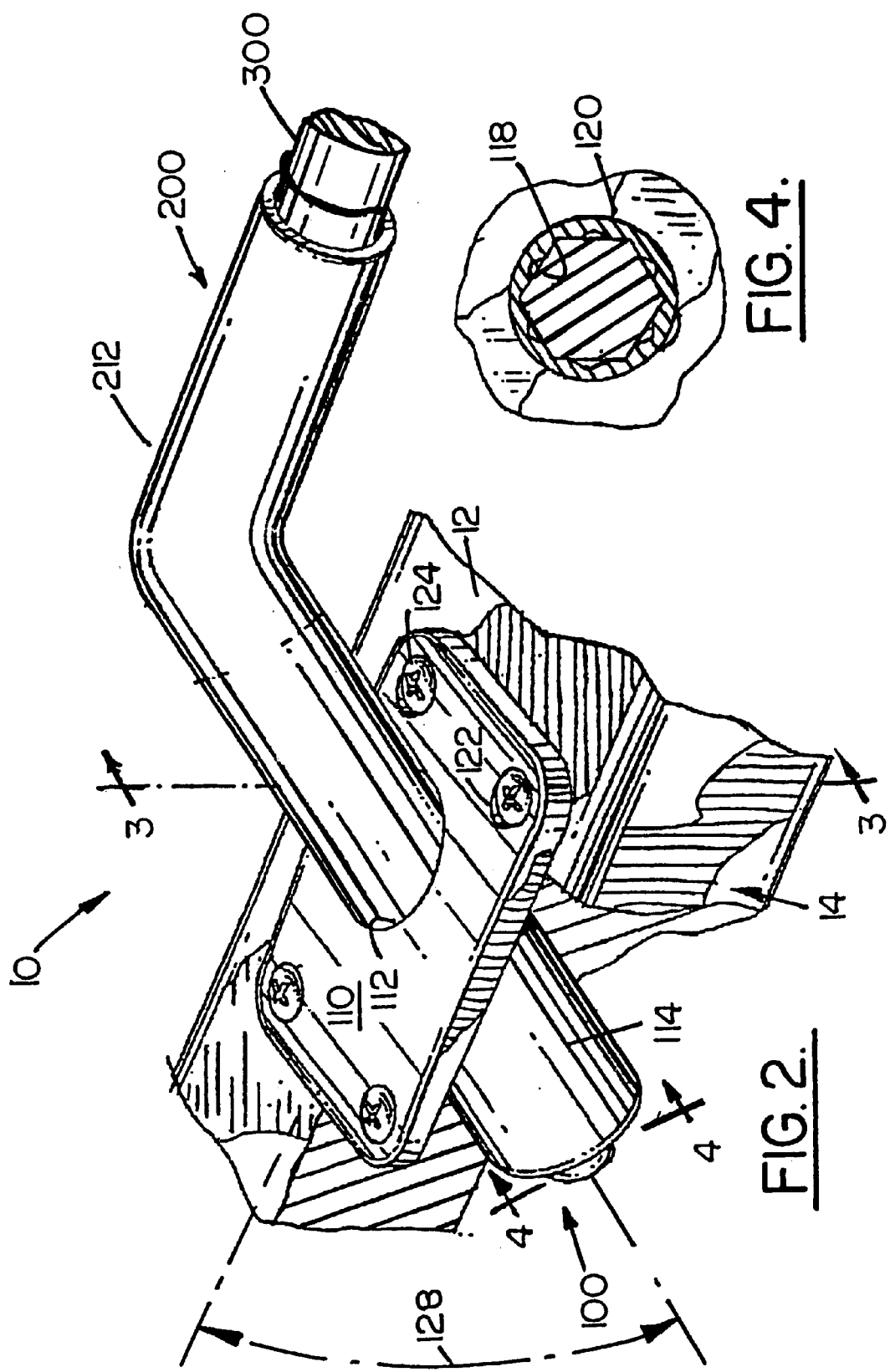

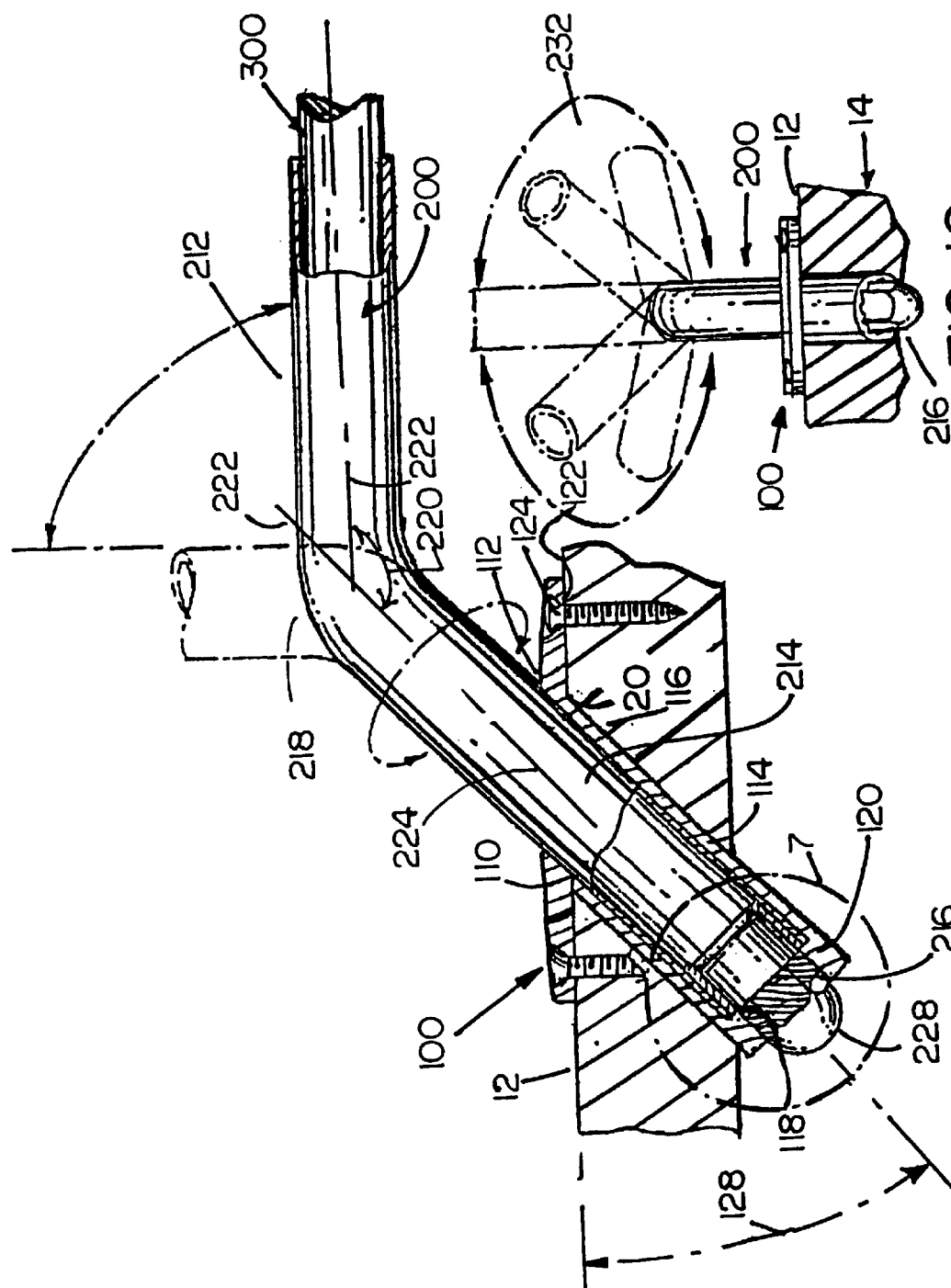

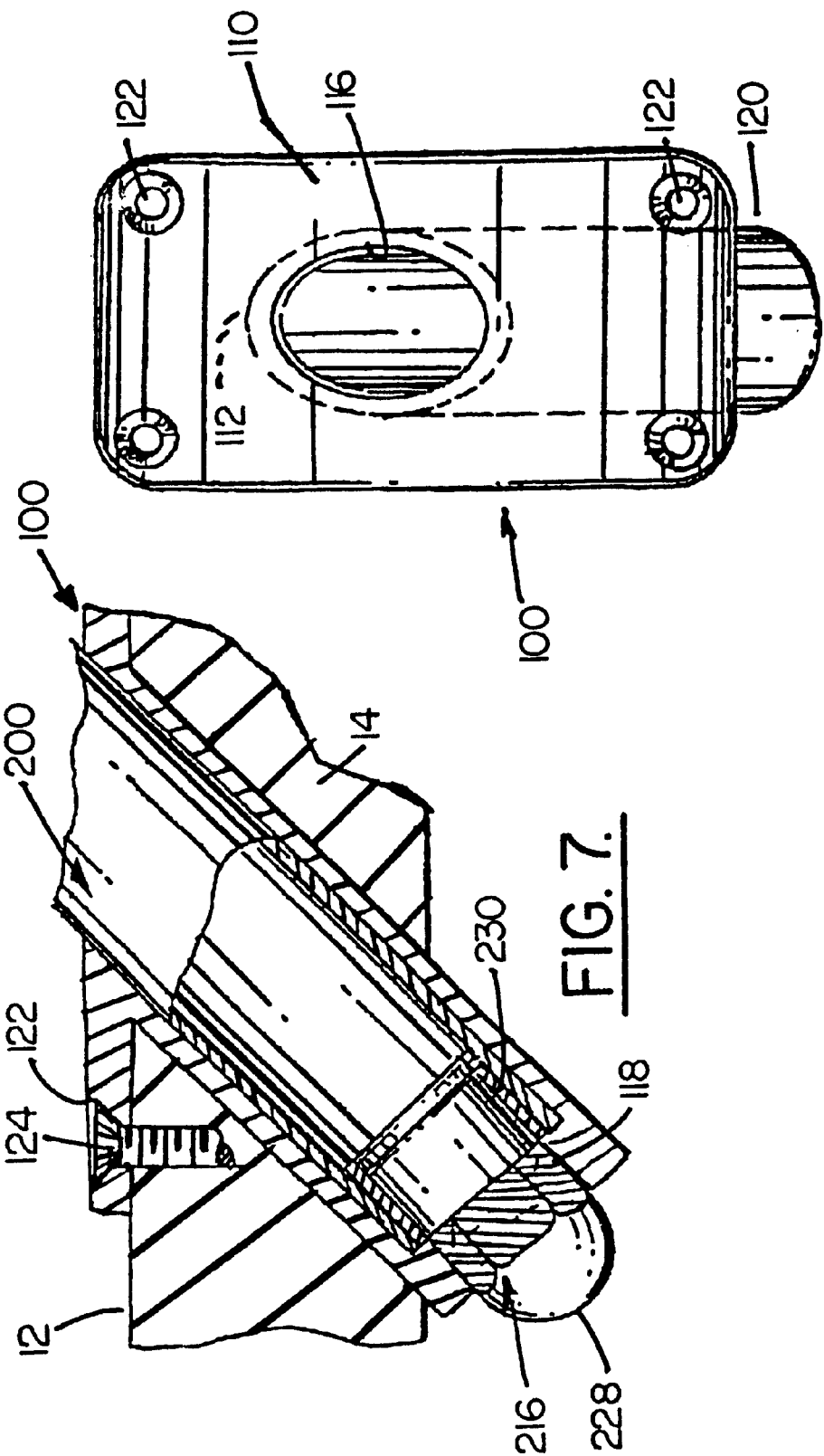

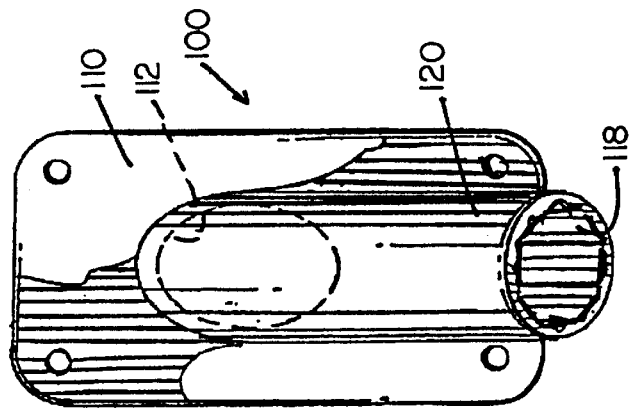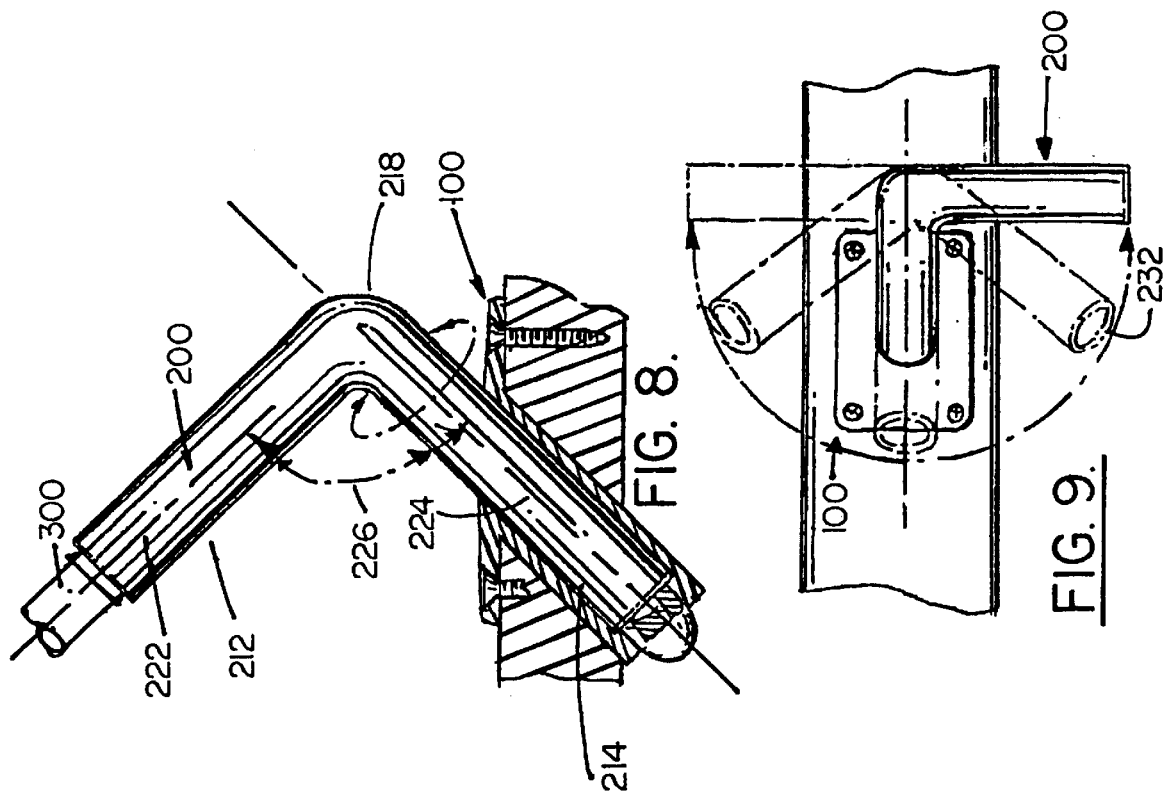

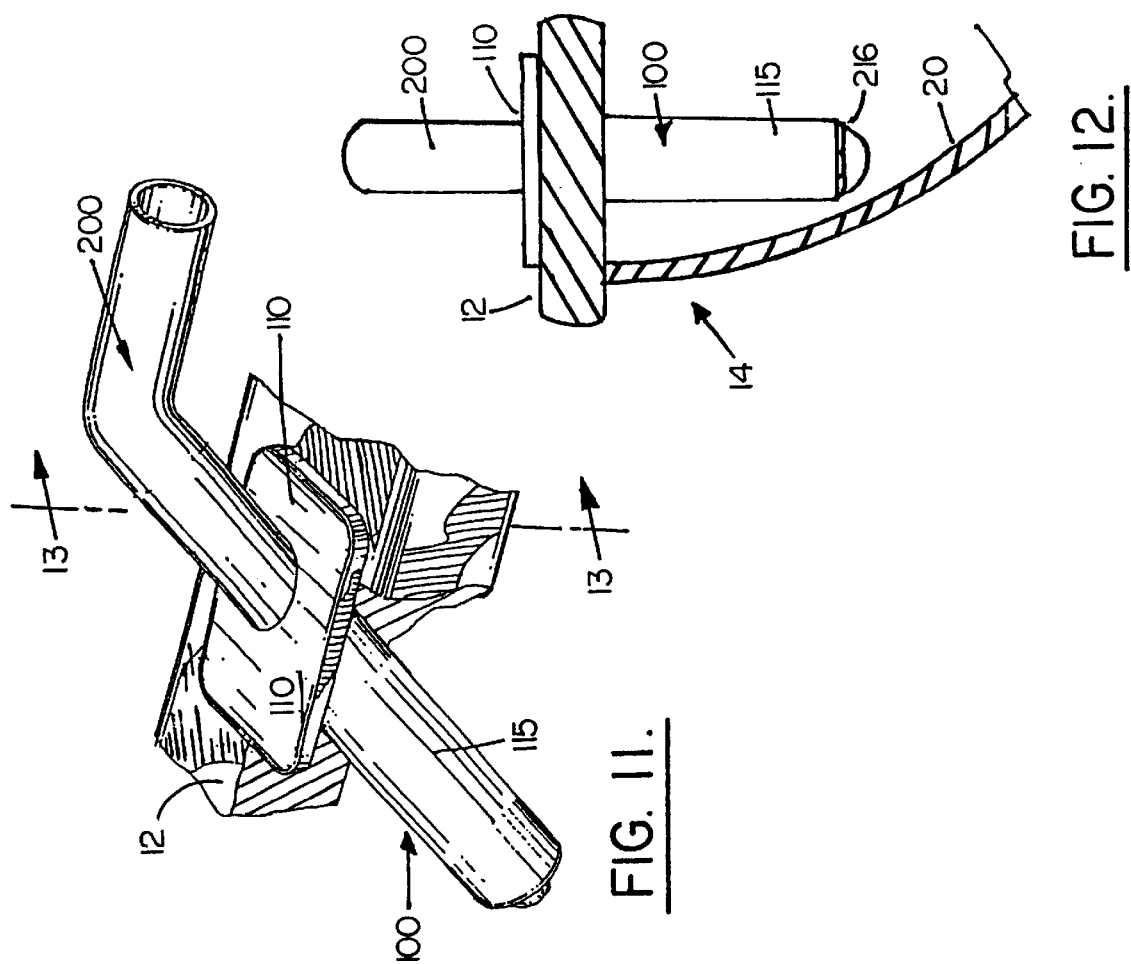

SPORT FISHING OUTRIGGER APPARATUS

FIELD OF INVENTION

The present invention relates generally to the field of sports fishing, and more particularly, to outriggers associated with power boating and guiding of trolling lines outward from the boat for luring fish.

BACKGROUND OF INVENTION

Sport fishing boats are typically equipped with outriggers for extending fishing and trolling lines out and beyond the wake of the moving boat and into calmer water where the fish are more apt to take the lure or bait. Fishermen have favorite techniques for rigging, operating and maintaining the outriggers and as a result, a boat captain needs to be able to provide more precise control over the positioning of a teaser or lure. An article in Sport Fishing Magazine, Summer '96 quotes a boat captain as saying that it is not unusual for him to adjust his outrigger twenty times a day. Precise control of the outrigger allows a teaser to be brought close to the baited hook awaiting that trophy sized fish for the angler to fight, play, and ultimately reel in. In addition, the tag-and-release of big fish using multiple trolling lines typically gets complicated especially when the fish jumps next to the boat and gets tangled in the lines. The ability to adjust the outriggers controlling the lines as well as removing them from operation eliminates many problems. It is useful to be able to quickly adjust the outriggers for the varying conditions, including passing clearing a bridge under which the boat must pass.

Typically, a pair of outriggers will be installed at starboard and port gunwale locations just forward of the angler and fishing pole.

Various outriggers and fishing rod holders are known in the art. By way of example, U.S. Pat. No. 3,063,668 to Yohe describes a telescoping outrigger moveable between a retraced inoperable position within boundary of the boat, to an operable position extending outwardly beyond the gunwales. A telescoping spar is rotatably mounted on a base secured to a boat gunwale, whereby the outrigger may be swung about its pivot between the inoperable and operable positions. A detent rod is positioned for engagement at preselected locations about the pivot for locking the outrigger base at a selected incremental rotated orientation.

U.S. Pat. No. 4,993,346 to Rupp discloses an outrigger system that permits movement of the outrigger from a stowage position to a trolling position, and includes a tubular member having a castellated end for mating with a castellated end of a cylindrical element which rotates freely until secured by a collar using a cam to lock the collar against rotation.

In yet another outrigger device, described in U.S. Pat. No. 5,592,893 to Jordan, III et al., a sport fishing outrigger includes an indexable position adjustment locking mechanism for a rotatably deployable outrigger boom assembly. The mechanism includes a collar with a plurality of castellated, vertically oriented indexing slots which engage a metal locking bar.

SUMMARY OF INVENTION

In view of the foregoing background, it is therefore an object of the present invention to provide an apparatus for extending rigging and fishing lines outboard of the boat during trolling operation and boat movement from place to place while permitting easy retraction of an outrigger pole during trolling and when maneuvering through tight passages such as under low clearance bridges. It is further an object of the invention to provide an outrigger apparatus that is easily maintained when used in a destructive salt water environment, is easy to store when not in use, and can be mounted to a boat without regard for starboard or port side configurations. It is yet another object of the invention to provide an outrigger apparatus that can be easily positioned for various outrigger pole orientations while assuring accurate alignment of pole and lines.

This and other objects, advantages and features of the present invention are provided by a sport fishing boat outrigger apparatus for mounting to a gunwale of the boat and for extending fishing lines outwardly from the boat. The outrigger apparatus comprises a mounting base for mounting to the gunwale and for receiving an outrigger pole holder, an outrigger pole holder carried by the mounting base for positioning an outrigger pole therein, and an outrigger pole carried by the outrigger pole holder.

In a preferred embodiment of the present invention, the mounting base comprising a base plate having an aperture for receiving the pole holder therethrough, a mounting base sleeve having an open proximal end integrally formed with the base plate for receiving an outrigger pole holder within the sleeve through the base plate aperture, and a socket affixed to the sleeve distal end for receiving a nut therein. The socket has a multi faceted bore wall for limiting rotation of the nut. The apparatus further includes mounting means for mounting the base plate to the boat gunwale. The outrigger pole holder comprises an arcuate tube rotatably journaled within the mounting base sleeve. The arcuate tube has an upper end portion extending outward of the sleeve for receiving an outrigger pole therein and a lower end portion of the arcuate tube has a nut for removably coupling with the mounting base socket.

Further, one preferred embodiment of the outrigger pole comprises a plurality of elongated tubular sections of successfully smaller cross-section telescopingly joined to form the outrigger pole, which outrigger pole is movable between a retracted position and a fully extended position. A spring lock assembly is carried within a first end of each elongated tubular section except the section having the largest cross-section. Each elongated tubular section first end includes a first hole for receiving a locking button therethrough. The spring lock assembly has a locking button biased radially outward through the first hole within the elongated tubular section first end. Each elongated tubular section has a second hole positioned within a second end of each elongated tubular section, except the section having the smallest cross-section. The second hole receives the locking button therethrough when the outrigger pole is in the fully extended position. A stop assembly is carried by the first end of each elongated tubular section, except the section having the largest cross-section, which stop assembly cooperates with the spring lock assembly for limiting the extended position such that the second hole within each of the elongated tubular sections is positioned for receiving the locking button therethrough when the outrigger pole is in the fully extended position. A plurality of eyelets is attached to the elongated poles for receiving a line therethrough and guiding the line outboard of the gunwale.

BRIEF DESCRIPTION OF DRAWINGS

A preferred embodiment of the invention as well as alternate embodiments are described by way of example with reference to the accompanying drawings in which:

FIG. 2 is a partial perspective view of one embodiment of a mounting base and outrigger pole holder;

FIG. 3 is a cross-sectional view through lines 3—3 of FIG. 2;

FIG. 4 is a cross-sectional view taken through lines 4—4 of FIG. 2;

FIG. 5 is a top plan view of a mounting base of an embodiment of the present invention;

FIG. 6 is a bottom plan view of the mounting base of FIG. 5;

FIG. 7 is a partial enlarged view of the embodiment of FIG. 3 within circle designation 7;

FIG. 8 is a cross-sectional view of an alternate embodiment of FIG. 3;

FIG. 9 is a top plan view of the embodiment of FIG. 8;

FIG. 10 is a side elevational view of the embodiment of FIG. 3;

FIG. 11 is another embodiment of FIG. 2;

FIG. 12 is a side elevational cut-away view of the embodiment of FIG. 11;

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
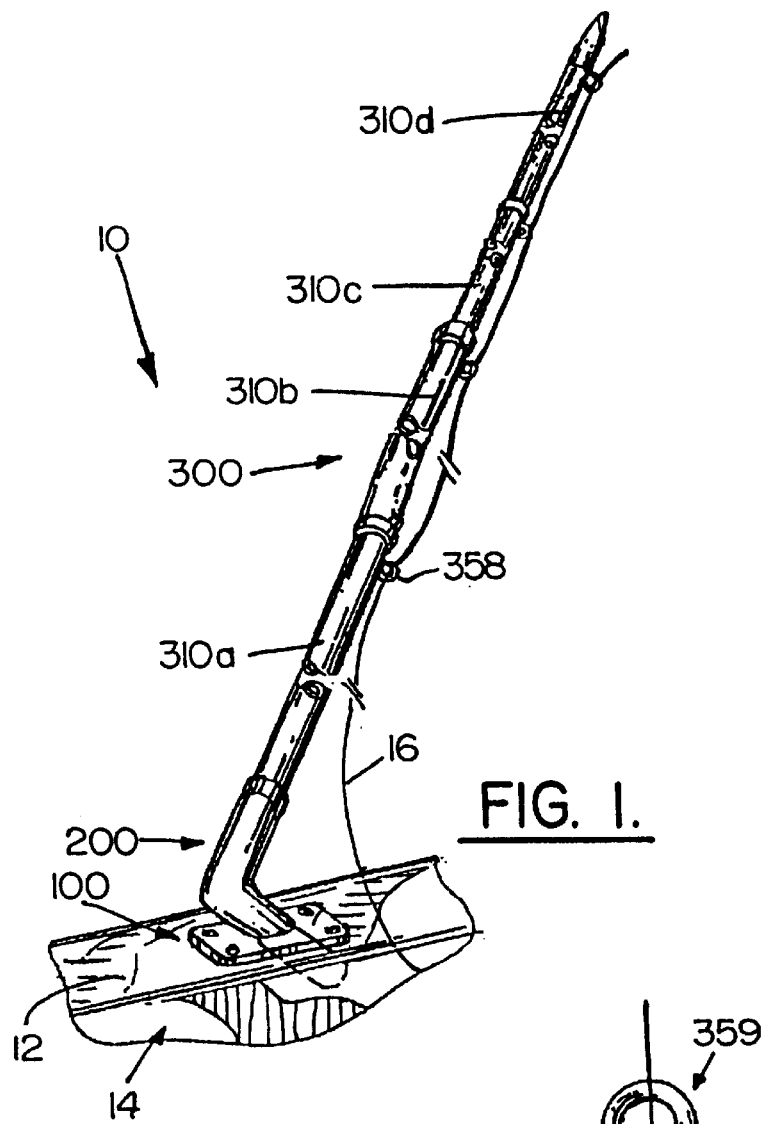
FIG. 1 is an exploded perspective view of one preferred embodiment of the present invention.
Figure 20:
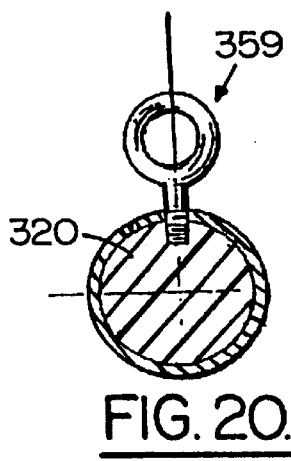
FIG. 20 is a cross-sectional view through lines 20—20 of FIG. 16.

Referring now to FIG. 1, one preferred embodiment of the present invention, a sport fishing boat outrigger apparatus 10 for mounting to a boat deck surface such as a gunwale 12 of the boat 14 and for extending fishing lines such as an outrigger rigging line 16 outwardly and outboard 18 from the boat, comprises, by way of example, a mounting base 100 mounted to the gunwale 12, which base engeagably receives an outrigger pole holder 200 for securing an outrigger pole 300.

The mounting base 100, in one preferred embodiment of the present invention, and as illustrated with reference to FIGS. 2 and 3, includes a base plate 110 having an aperture 112 for receiving the pole holder 200 therethrough, and a mounting base sleeve 114 having an open proximal end 116 integrally formed with the base plate for receiving the outrigger pole holder within the sleeve through the base plate aperture. In one embodiment of the present invention, the sleeve proximal end 116 is integrally formed with the base plate 110 to integrally form the plate to the sleeve proximal end. In a preferred embodiment, the mounting base 100 is an integrally formed cast piece. In a preferred embodiment, the mounting base 100 and outrigger pole holder 200 are formed from stainless steel materials for providing strength, minimum maintenance arid protection against a salt water environment.

With reference to FIGS. 4 through 6, and again with reference to FIGS. 2 and 3, the mounting base 100 comprises a hex-nut socket 118 affixed to the sleeve distal end 120 for receiving a hex-nut therein, as will be described later with reference to the outrigger pole holder 200. By way of example, the hex-nut and socket combination provides twelve pre-selected rotational positions to choose from when orienting the holder 200 within the mounting base 100. It is appreciated that various styled sockets having a multi faceted bore wall can be used. The mounting base 100, in one embodiment of the present invention, comprises mounting means for mounting the base plate 110 to the boat gunwale 12 which includes the base plate 110 having mounting holes 122 passing therethrough for receiving mounting screws 124 for securing the mounting base to the boat gunwale. The gunwale 12 has an opening or hole 20 for receiving the mounting base sleeve 114 therethrough.

In one preferred embodiment of the present invention, and as illustrated with reference to FIGS. 2 and 3, a longitudinal axis 126 of the mounting base sleeve 114 forms an acute angle 128 with an imaginary plane including the base plate 110. In one embodiment of the present invention, the angle 128 comprises approximately a forty five degree angle.

As illustrated with reference to FIGS. 7 through 10, and again to FIGS. 2 and 3, the outrigger pole holder 200 is carried by the mounting base 100 for positioning the outrigger pole 300, earlier described with reference to FIG. 1, therein. The outrigger pole holder 200 comprises an arcuate tube 210 rotatably journaled within the mounting base sleeve 114. The arcuate tube 210 comprises an upper end portion 212 extending outward of the sleeve 114 for receiving the outrigger pole 300 therein, and a lower end portion 214 comprising a nut 216 for removably coupling with the mounting base socket 118.

As illustrated again with reference to FIGS. 3 and 8, the arcuate tube 210 of the outrigger pole holder 200 comprises an angle bend 218 between the arcuate tube upper end portion 212 and the lower end portion 214 carried within the sleeve 114. In one embodiment, the angle bend 218 comprises approximately a forty five degree angle 220, as illustrated with reference to FIG. 3, formed between the upper axis 222 and lower axis 224 of the arcuate tube end portions 212, 214. In a second embodiment, as illustrated with reference to FIG. 8, the angle bend 218 comprises approximately a ninety degree angle 226 formed between the axes 222, 224.

Figure 7A:
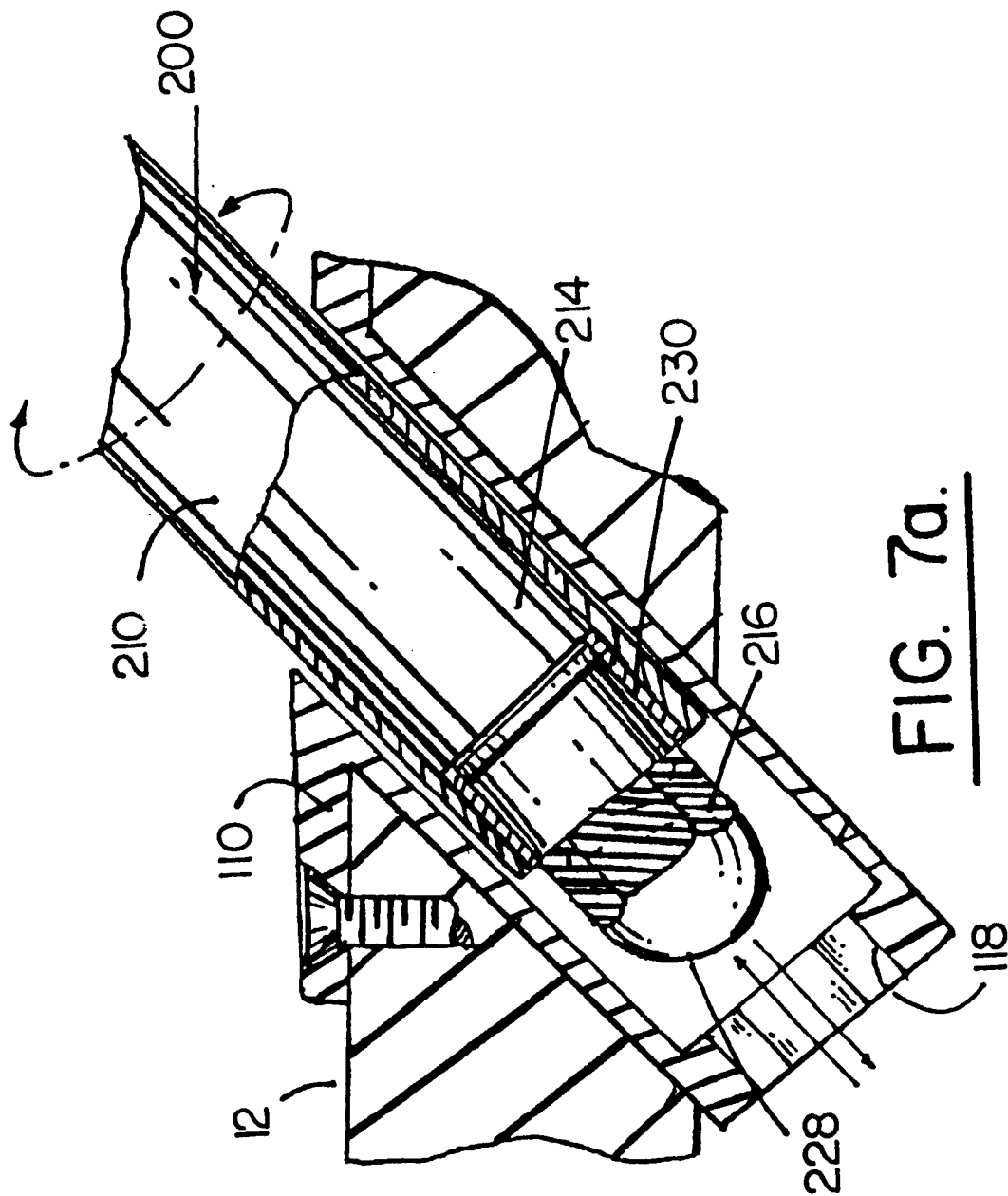
FIG. 7a is the partial enlarged view of FIG. 7 illustrating the pole holder nut removed from its locking position within the socket.
Figure 15:
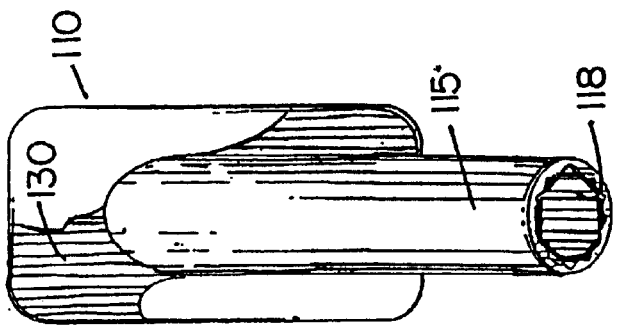
FIG. 15 is a bottom plan view of the mounting base of FIG. 11.
Figure 14:
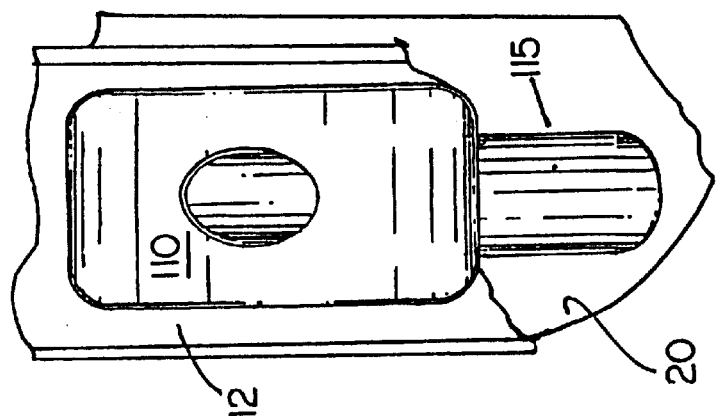
FIG. 14 is a cut-away top plan view of the mounting base of FIG. 11.
Figure 13:
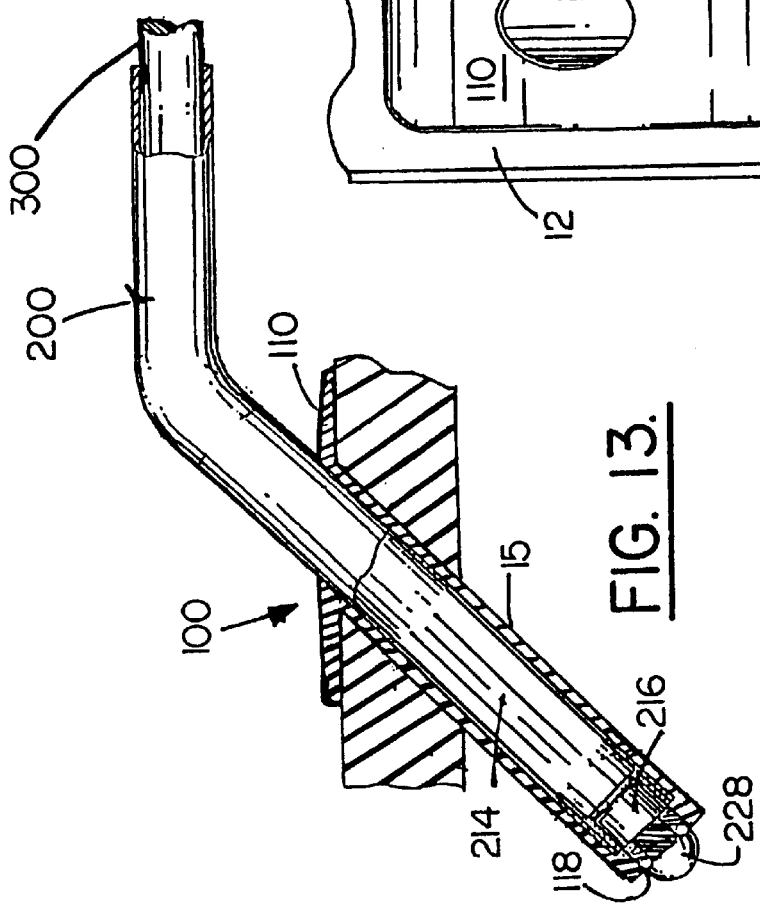
FIG. 13 is a cross-sectional view through lines 13—13 of FIG. 11.

Further, and as again illustrated by way of example with reference to FIGS. 3, 7 and 7a, the hex-nut 216 comprises a rounded over end portion 228 for guiding the nut into the socket 118 as the outrigger pole holder 200 receivably engages the mounting base 100. The rounded over end portion 228 provides a smooth sliding of the nut 216 and thus the outrigger pole holder 200 out of and into the mounting base socket 118. In addition, the rounded over end portion 228 eliminates sharp corners or edges that can scratch boat surface finishes. In one embodiment, as illustrated by way of example with reference again to FIG. 7, the hex-nut 216 comprises a spacer sleeve 230 which is welded to the tubular lower end portion 214 of the arcuate tube 210. In a preferred embodiment, the hex-nut 216 is pre-aligned with the socket 118 prior to welding to the arcuate tube lower end portion 214 for providing desirable rotational positions 232, as illustrated again with reference to FIGS. 9 and 10, for directing the outrigger pole holder 200 within the mounting base 100, and thus for directing the outrigger pole 300 into preferred positions when positioned within the holder 200. By way of example, with the sleeve acute angle 128 of approximately forty five degrees and the pole holder arcuate tube angle bend 218 at approximately forty five degrees 220, the outrigger pole 300 can be positioned generally horizontal and along the boat deck for accommodating the maneuvering of the boat under a low clearance bridge or the like. In operation, the outrigger pole holder 200 is set into the mounting base 100 with the nut 216 engagedly secured within the socket 118 of the mounting base 100. When it is desired to re-orient the pole holder 200 or outrigger pole 300 when in the holder, the pole holder 200 is displaced outwardly from the socket 114 for releasing the nut 216 therefrom, as earlier described and illustrated with reference to FIGS. 7 and 7a. The arcuate tube 210 is then rotated and repositioned with the nut 216 engaging the socket 118. Various pole orientations are thus achieved as desired by the boater and circumstances with which the boater must content, as herein described by way of example.

As illustrated with reference to FIGS. 11 through 15, it is expected that a alternate base sleeve 115 will include a length for accommodating various shaped hulls 20. Further, alternate mounting means for mounting the base plate 110 to a boat surface such as the gunwale 12 will include an adhesive surface 130 depending on the materials used for both the base plate 110 and the gunwale 12, thus eliminating the need for the mounting holes 122.

With reference to FIG. 16, and again to FIGS. 1 and 3, the outrigger pole 300 is carried in a rotatably engageable manner by the outrigger pole holder 200. In one preferred embodiment of the present invention, the outrigger pole 300 comprises a plurality of elongated tubular sections 310 of successfully smaller cross-section telescopingly joined to form the outrigger pole 300. As a result, the outrigger pole 300 is movable between a retracted position 312, as illustrated with reference to FIG. 17, and a fully extended position 314, as illustrated with reference to FIG. 18, and again to FIG, 1.

Again with reference to FIGS. 1, and 16 through 18, the outrigger pole 300 comprises a spring lock assembly 316 carried within a first end 318 of each elongated tubular section, except the section 310a having the largest cross-section. Various embodiments of the present invention will include three, four and five tubular sections 310 depending on the particular need of the sport fishing boat, for providing generally eleven, fifteen, and eighteen foot outrigger poles. By way of example, FIG. 1 illustrates the outrigger pole 300 having four tubular sections 310a, 310b, 310c, and 310d.

Figure 16:
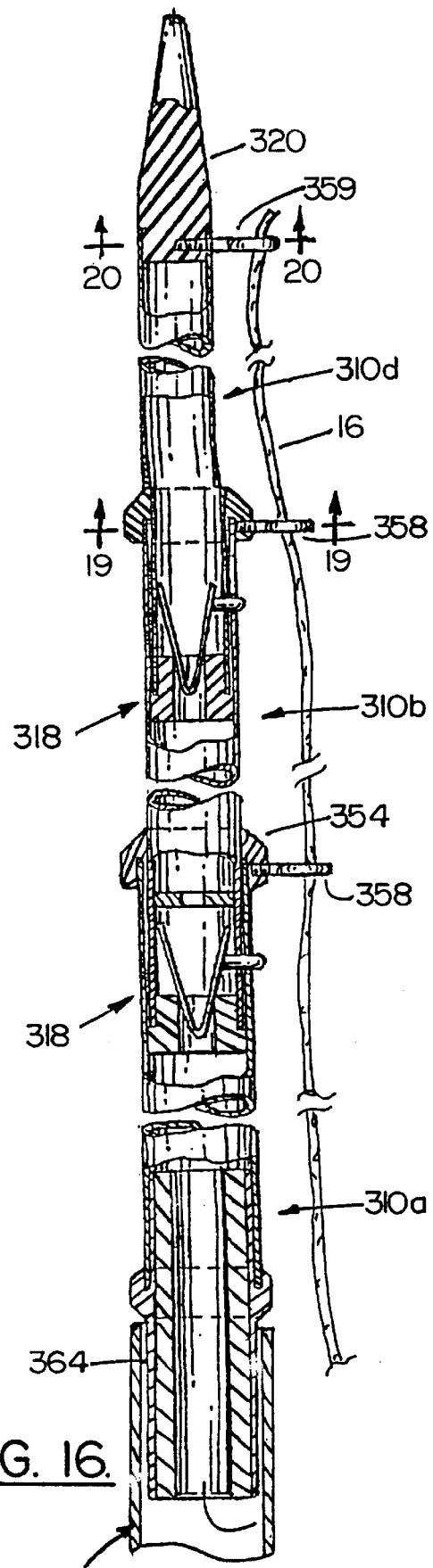
FIG. 16 is an exploded cut-away view of one embodiment of an outrigger pole of the present invention.

FIG. 16, by way of example illustrates the outrigger pole 300 having three tubular sections 310a, 310b, and 310d. Again with reference to FIG. 16, the outrigger pole 300 comprises, by way of example, a lower tubular section 310a having open ends, an intermediate tubular section 310b having open ends, the intermediate tubular section slidable engaged within the lower tubular section, and an upper tubular section 310d slidably engaged within the intermediate tubular section. The upper tubular section 310d includes a lower open end and an end cap 320 affixed to its uppermost end. The tubular sections 310 provide for fluid access within the sections through the lower tubular section open end 322 for rinsing internal surfaces therein collecting salt, sand, debris and the like, typically found within the salt water fishing environment. In a preferred embodiment, the tubular sections 310 comprise anodized aluminum for meeting the demands of a salt water environment.

As illustrated again with reference to FIGS. 17 and 18, each elongated tubular section first end 318 includes a first hole 324 for receiving a locking detent or button 326 therethrough. The spring lock assembly 316 includes the locking button 326 biased radially outward through the first hole 324 within the elongated tubular section first end 318. Each elongated tubular section 310 further includes a second hole 328 positioned within a second end 330 of each elongated tubular section 310, except the section 310d having the smallest cross-section. The second hole 328 receives the locking button 326 therethrough when the outrigger pole 300 is in the fully extended position 314a stop assembly 332 is carried by the first end 318 of each elongated tubular section 310, except the section 310a having the largest cross-section. The stop assembly 332 cooperates with the spring lock assembly 316 for limiting the fully extended position 314 such that the second hole 328 within each of the elongated tubular sections 310 is positioned for receiving the locking button 326 therethrough when the outrigger pole 300 is in the fully extended position 314, as again illustrated with reference to FIG. 18.

Figure 17:
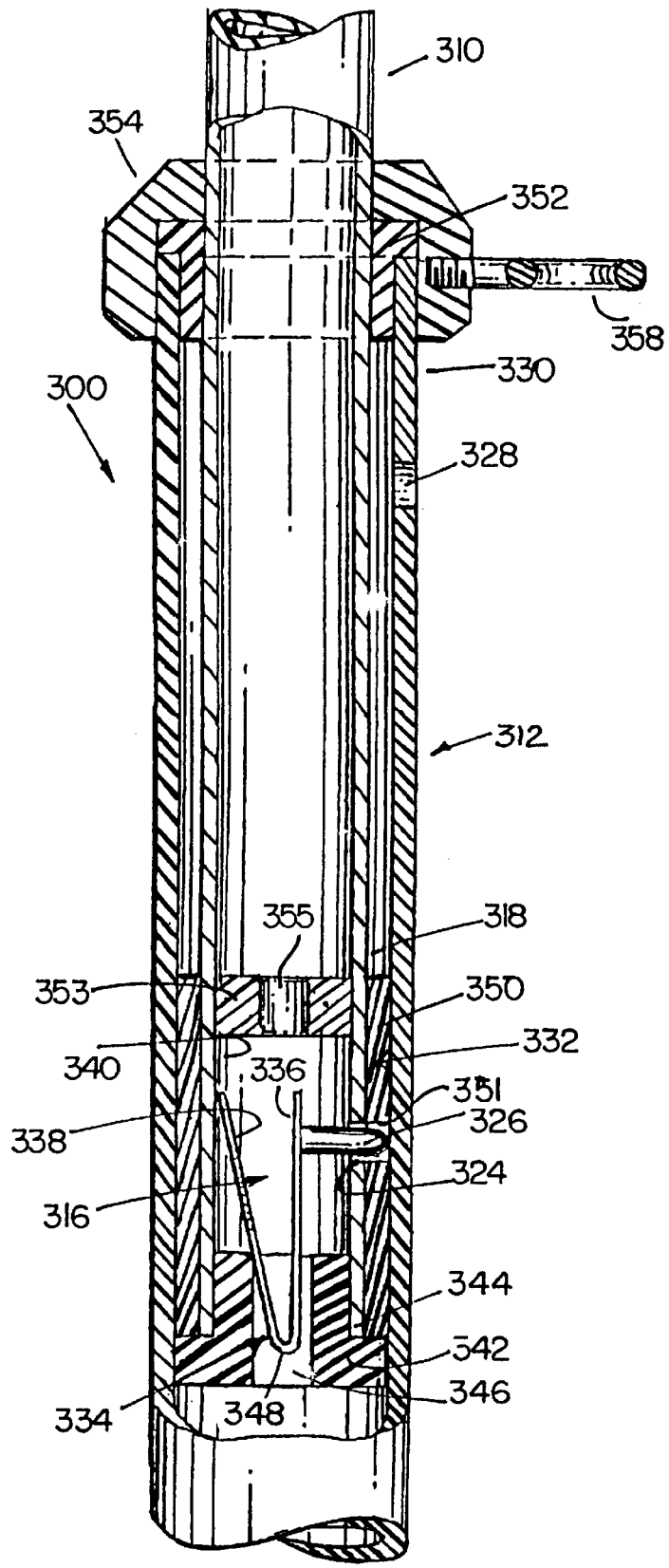
FIG. 17 is a partial cross-sectional view of tubular sections of an embodiment of the present invention illustrating a retracted arrangement of the tubular sections.
Figure 18:
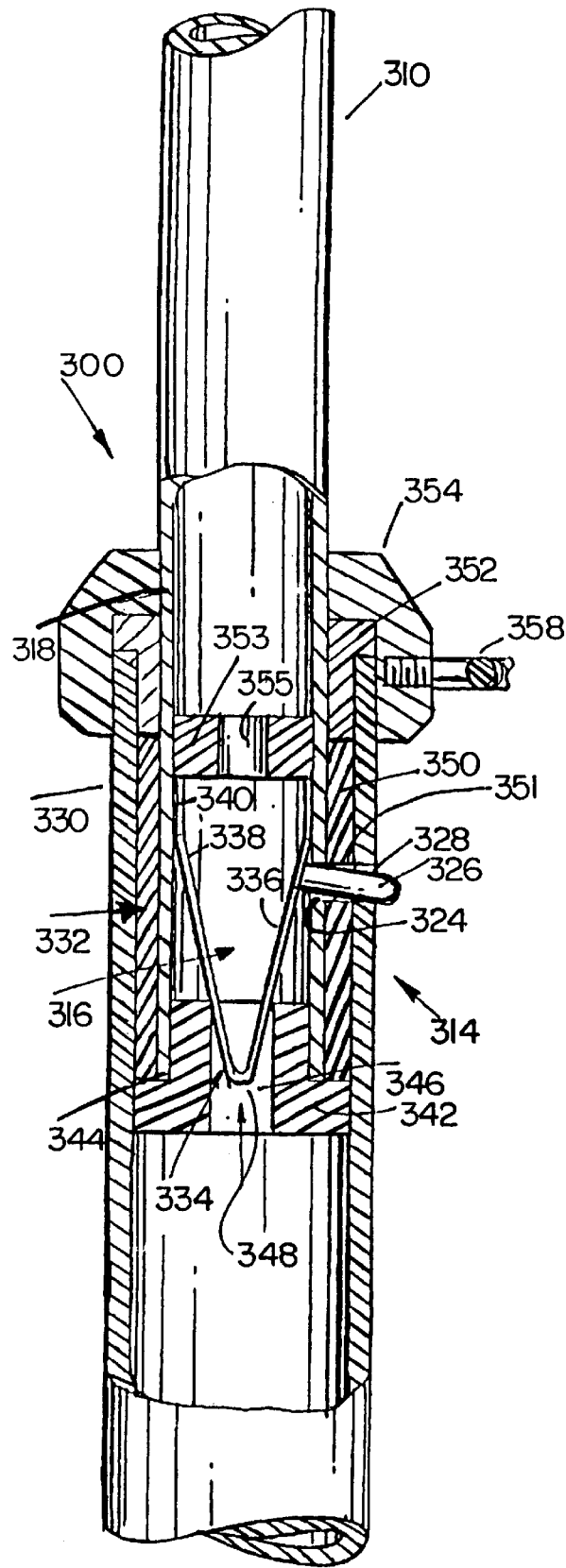
FIG. 18 is a partial cross-sectional view of the tubular sections of FIG. 17 illustrating a fully extended position of the tubular sections.

In a preferred embodiment of the present invention, again as illustrated with reference to FIGS. 17 and 18, the spring lock assembly 316 comprises a hair pin styled spring 334. The locking button 326 is attached to one spring leg 336 and an opposing second spring leg 338 biasingly engages an inside wall portion 340 of the elongated tubular section first end 318, the inside wall portion opposing the first hole 324. A bushing styled bung 342 is carried within each end 344 of the tubular sections 310 having the spring lock assembly 316, the bung having a bore 346 therethrough for receiving a hinge portion 348 of the hair pin styled spring 334. The hair pin styled spring 334 is engagable within the bore for limiting outward biasing of the spring legs 336, 338.

Again with reference to FIGS. 17 and 18, the stop assembly 332 in one preferred embodiment, comprises a stop sleeve 350 carried on an outside tubular wall surface of the tubular section first end 318, except the section 310a having the largest cross-section. A tubular stop bushing 352 is affixed to the tubular section second end 330. The stop bushing 352 extends into the tubular section second end 330 for engaging the stop sleeve 350 when the outrigger pole 300 is in the fully extended position 314. The stop sleeve 350 and stop bushing 352 have length dimensions for positioning the locking button 326 for engaging the tubular section second hole 328 for locking the outrigger pole 300 in the fully extended position, as illustrated again with reference to FIG. 18. The stop sleeve 350 in the embodiment illustrated has a hole 351 cooperating with the tubular section first hole 324 for receiving the locking button 326 therethrough. In a preferred embodiment of the present invention, the bung 342, sleeve 350, and the bushing 352 comprise a non-metallic material for providing ease of telescoping movement and operation of the outrigger pole 300 during movement to and from the retracted 312 and extended 314 positions. The tubular section walls, generally of an aluminum material, are therefore making primary contact with non-metallic materials.

As again illustrated with reference to FIGS. 17 and 18, a stop spacer 353 is affixed to the inside wall portion 340 just above the spring 334. The stop spacer 353 engages the bund 342 in a cooperating tubular section, illustrated by way of example in FIG. 17a, wherein the stop spacer 353b engages the bung 342c when the telescoping sections 310b, 310c are in a fully retracted position 313.

Figure 17A:
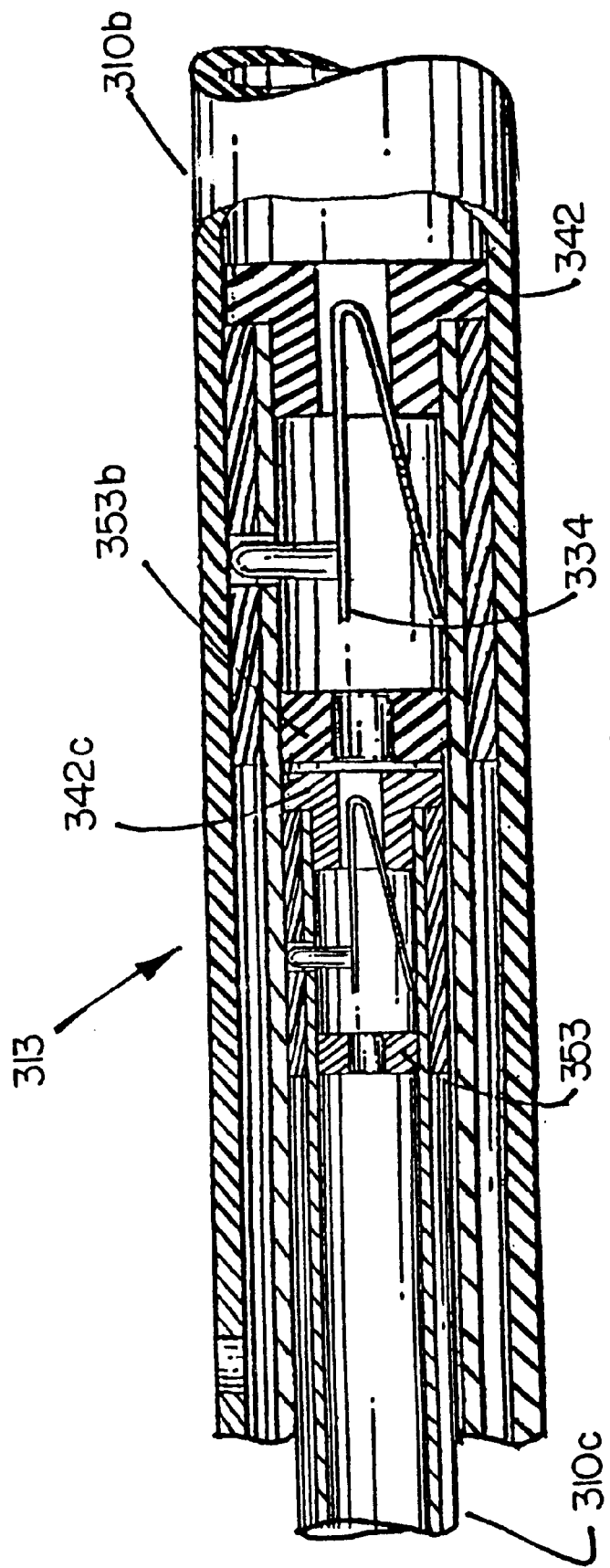
FIG. 17a is a partial cross-sectional view of the tubular sections illustrating a fully retracted outrigger pole position.

Thus, the stop spacer 353 protects the spring lock assembly 316 and prevents it from being struck by upper telescoping sections as again illustrated with reference to FIG. 17a. Again as illustrated with reference to FIGS. 17 and 18, the stop spacer 353 includes a bore 355 therethrough. The stop spacer bore 355, in combination with the bung bore 346 within their respective tubular sections 310, and the pole section open end 322 described with reference to FIG. 16, provide fluid access to inside the tubular sections for flushing out the tubular sections as part of a maintenance procedure as earlier described.

Figure 19:
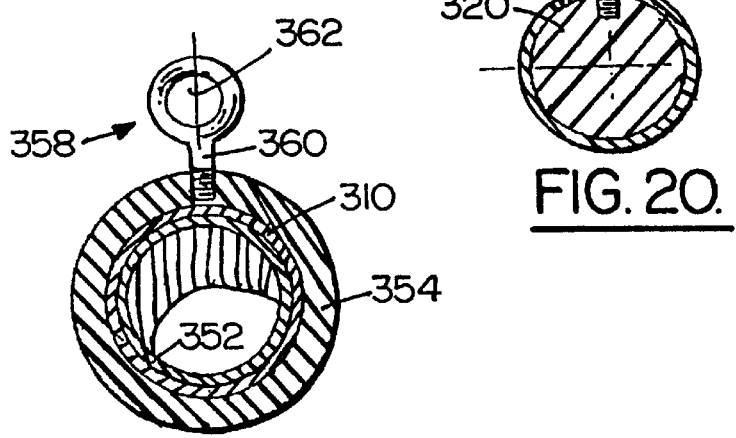
FIG. 19 is a cross-sectional view through lines 19—19 of FIG. 16.

As illustrated with reference to FIG. 19 and again with reference to FIGS. 1 and 16, the outrigger pole 300 further comprises a guide ring 354 affixed to the second end 330 of each tubular section 310 carrying the stop bushing 352. The guide ring 354 secures the stop bushing 352 to the tubular section 310.

The stop assembly 332 thus provides a positively locking method for positioning the outrigger pole 300 in its fully extended position 314 and a defined extension for the pole 300 when extending the line 16 outboard of the boat 14.

As illustrated with reference to FIG. 20 and FIGS. 1 and 16 through 19, a plurality of eye bolts 358 are secured to the guide rings 354. Each eyebolt 358 includes a shaft portion 360 for securing the eyebolt to the guide ring 354 and a circular portion for providing an eyelet 362 through which the line 16 is fed for guiding the line outboard of the gunwale 12. As illustrated again with reference to FIG. 20, an uppermost eyebolt 359 is secured to the end cap 320.

Again with reference to FIG. 16, the outrigger pole 300 includes a pole holder sleeve 364 for providing a precision sliding fit of the outrigger pole 300 into the pole holder 200. The sleeve 364 is preferably made from a material for providing a non-corroding connection between the pole 300 and holder 200.

Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and alternate embodiments are intended to be included within the scope of the appended claims.

That which is claimed is:

1. A sport fishing boat outrigger apparatus for mounting to a gunwale of the boat and for extending fishing lines outwardly from the boat, the outrigger apparatus comprising:

a mounting base for mounting to the gunwale and for receiving an outrigger pole holder, the mounting base comprising:

a base plate having an aperture for receiving the pole holder therethrough;

a mounting base sleeve having an open proximal end integrally formed with the base plate for receiving an outrigger pole holder within the sleeve through the base plate aperture;

a socket affixed to the sleeve distal end for receiving a nut therein, the socket having a multi faceted bore wall for limiting rotation of the nut; and mounting means for mounting the base plate to the boat gunwale;

an outrigger pole holder carried by the mounting base for positioning an outrigger pole therein, the outrigger pole holder comprising:

an arcuate tube rotatably journaled within the mounting base sleeve, the arcuate tube having an upper end portion extending outward of the sleeve for receiving an outrigger pole therein; and a nut affixed to a lower end portion of the arcuate tube for removably coupling the arcuate tube with the mounting base socket; and an outrigger pole carried by the outrigger pole holder, the outrigger pole comprising:

a plurality of elongated tubular sections of successfully smaller cross-section telescopingly joined to form the outrigger pole, which outrigger pole is movable between a retracted position and a fully extended position;

a spring lock assembly carried within a first end of each elongated tubular section except the section having the largest cross-section, each elongated tubular section first end having a first hole for receiving a locking button therethrough, the spring lock assembly having a locking button biased radially outward through the first hole within the elongated tubular section first end, each elongated tubular section having a second hole positioned within a second end of each elongated tubular section except the section having the smallest cross-section, the second hole receiving the locking button therethrough when the outrigger pole is in the extended position;

a stop assembly carried by the first end of each elongated tubular section, except the section having the largest cross-section, the stop assembly cooperating with the spring lock assembly for limiting the extended position such that the second hole within each of the elongated tubular sections is positioned for receiving the locking button therethrough when the outrigger pole is in the fully extended position; and a plurality of eyelets attached to the elongated poles for receiving a line therethrough and guiding the line outboard of the gunwale.

2. The outrigger apparatus according to claim 1, wherein a longitudinal axis of the mounting base sleeve forms an acute angle with an imaginary plane including the base plate.

3. The outrigger apparatus according to claim 2, wherein the acute angle approximates a forty five degree angle.

4. The outrigger apparatus according to claim 1, wherein the mounting means comprises the base plate having mounting holes passing therethrough for receiving mounting screws for securing the mounting base to the boat gunwale, the gunwale having an opening for receiving the mounting base sleeve.

5. The outrigger apparatus according to claim 1, wherein the arcuate tube of the outrigger pole holder comprises an angle bend between the arcuate tube upper end portion and the lower end portion.

6. The outrigger apparatus according to claim 5, wherein the angle bend comprises approximately a forty five degree angle formed between axes of the upper and lower arcuate tube end portions.

7. The outrigger apparatus according to claim 5, wherein the angle bend comprises approximately a ninety degree angle formed between the axes of the upper and lower arcuate tube end portions.

8. The outrigger apparatus according to claim 1, wherein the socket comprises a hex-nut socket and the nut comprises a hex-nut operable with the hex-nut socket.

9. The outrigger apparatus according to claim 1, wherein the nut comprises a rounded over end portion for guiding the nut into the socket as the outrigger pole holder receivably engages the mounting base.

10. The outrigger apparatus according to claim 1, wherein the plurality of elongated tubular sections comprises:
 a lower tubular section having open ends;
 an intermediate tubular section having open ends, the intermediate tubular section slidable engaged within the lower tubular section; and
 an upper tubular section slidably engaged within the intermediate tubular section, the upper tubular section having a lower open end and an end cap affixed to its uppermost end, and wherein the tubular sections provide fluid access within the sections through the lower tubular section open end for rinsing internal surfaces therein.

11. The outrigger apparatus according to claim 1, wherein the spring lock assembly comprises a hair pin styled spring, the locking button attached to one spring leg and an opposing second spring leg biasingly engaging an inside wall portion of the elongated tubular section first end, the inside wall portion opposing the first hole.

12. The outrigger apparatus according to claim 11, further comprising a bung carried within each end of the tubular sections having the spring assembly, the bung having a bore therethrough for receiving a hinge portion of the hair pin styled spring, the hair pin styled spring engagable within the bore for limiting outward biasing of the spring legs.

13. The outrigger according to claim 1, wherein the stop assembly comprises:
 a stop sleeve carried on an outside tubular wall surface of the tubular section first ends, except the section having the largest cross-section; and
 a tubular stop bushing affixed to the tubular section second ends, the stop bushing extending into the tubular section second end for engaging the stop sleeve when the outrigger pole is in the fully extended position, the stop sleeve and stop bushing having length dimensions for positioning the locking button for engaging the tubular section second hole for locking the outrigger pole in the fully extended position.

14. The outrigger apparatus according to claim 13, further comprising a guide ring affixed to the second end of each tubular section carrying the stop bushing, the guide ring securing the stop bushing to the tubular section.

15. The outrigger according to claim 14, further comprising an eyebolt secured to the guide ring, the eyebolt having a shaft portion for securing the eyebolt to the guide ring and a circular portion for providing the eyelet.

16. The outrigger according to claim 13, wherein the stop sleeve has a hole cooperating with the tubular section first hole for receiving the locking button therethrough.

17. The outrigger apparatus according to claim 1, further comprising a stop spacer affixed proximate the tubular section first end wherein the spring lock assembly is positioned between the stop spacer and the tubular section first end, the stop spacer engaging a telescoping second tubular section first end when in a fully retracted pole position.

18. The outrigger apparatus according to claim 17, wherein the stop spacer is affixed within the tubular section and wherein the stop spacer includes a bore therethrough.

19. The outrigger according to claim 1, further comprising eye bolts fastened to the second end of end tubular section, the eye bolts having a shaft portion for attaching the eyebolt to the tubular section and a circular end portion for providing the eyelets.

20. A sport fishing boat outrigger apparatus for mounting to a deck surface of the boat and for extending fishing lines outwardly from the boat, the outrigger apparatus comprising:
 a mounting base for mounting to the deck surface and for receiving an outrigger pole holder, the mounting base comprising:
  a base plate having an aperture for receiving the pole holder therethrough;
  a mounting base sleeve having an open proximal end integrally formed with the base plate for receiving an outrigger pole holder within the sleeve through the base plate aperture; and
  a socket affixed to the sleeve distal end for receiving a nut therein, the socket having a multi faceted bore wall for limiting rotation of the nut; and
 an outrigger pole holder carried by the mounting base for positioning an outrigger pole therein, the outrigger pole holder comprising:
  an arcuate tube rotatably journaled within the mounting base sleeve, the arcuate tube having an upper end portion extending outward of the sleeve for receiving an outrigger pole therein; and
  a lower end portion of the arcuate tube having a nut for removably coupling with the mounting base socket; and
 an outrigger pole carried by the outrigger pole holder, the outrigger pole having a plurality of eyelets attached thereto for receiving a line therethrough and guiding the line outboard of the deck surface.

21. The outrigger apparatus according to claim 20, further comprising mounting means for mounting the base plate to the boat deck surface.

22. The outrigger apparatus according to claim 21, wherein the mounting means comprises the base plate having mounting holes passing therethrough for receiving mounting screws for securing the mounting base to the boat deck surface, the deck surface having an opening for receiving the mounting base sleeve.

23. The outrigger apparatus according to claim 20, wherein the outrigger pole comprises:
 a plurality of elongated tubular sections of successfully smaller cross-section telescopingly joined to form the outrigger pole, which outrigger pole is movable between a retracted position and a fully extended position;
 a spring lock assembly carried within a first end of each elongated tubular section except the section having the largest cross-section, each elongated tubular section first end having a first hole for receiving a locking button therethrough, the spring lock assembly having a locking button biased radially outward through the first hole within the elongated tubular section first end, each elongated tubular section having a second hole positioned within a second end of each elongated tubular section except the section having the smallest cross-section, the second hole receiving the locking button therethrough when the outrigger pole is in the extended position; and a stop assembly carried by the first end of each elongated tubular section, except the section having the largest cross-section, the stop assembly cooperating with the spring lock assembly for limiting the extended position such that the second hole within each of the elongated tubular sections is positioned for receiving the locking button therethrough when the outrigger pole is in the fully extended position.

24. The outrigger apparatus according to claim 20, wherein a longitudinal axis of the mounting base sleeve forms an acute angle with an imaginary plane including the base plate.

25. The outrigger apparatus according to claim 24, wherein the acute angle is approximately a forty five degree angle.

26. The outrigger apparatus according to claim 20, wherein the arcuate tube of the outrigger pole holder comprises an angle bend between the arcuate tube upper end portion and the lower end portion.

27. The outrigger apparatus according to claim 26, wherein the angle bend comprises approximately a forty five degree angle formed between axes of the upper and lower arcuate tube end portions.

28. The outrigger apparatus according to claim 26, wherein the angle bend comprises approximately a ninety degree angle formed between the axes of the upper and lower arcuate tube end portions.

29. The outrigger apparatus according to claim 20, wherein the socket comprises a hex-nut socket and the nut comprises a hex-nut operable with the hex-nut socket.

30. The outrigger apparatus according to claim 20, wherein the nut comprises a rounded over end portion for guiding the nut into the socket as the outrigger pole hole receivably engages the mounting base.

31. A sport fishing boat outrigger apparatus for mounting to a deck surface of the boat and for extending fishing lines outwardly from the boat, the outrigger apparatus comprising:

a plurality of elongated tubular sections of successfully smaller cross-section telescopingly joined to form an outrigger pole, which outrigger pole is movable between a retracted position and a fully extended position;

a spring lock assembly carried within a first end of each of the plurality of elongated tubular sections except the section having the largest cross-section, each elongated tubular section first end having a first hole for receiving a locking button therethrough, the spring lock assembly having a locking button biased radially outward through the first hole within the elongated tubular section first end, each elongated tubular section having a second hole positioned within a second end of each elongated tubular section except the section having the smallest cross-section, the second hole receiving the locking button therethrough when the outrigger pole is in the extended position;

a stop assembly carried by the first end of each elongated tubular section, except the section having the largest cross-section, the stop assembly cooperating with the spring lock assembly for limiting the extended position such that the second hole within each of the elongated tubular sections is positioned for receiving the locking button therethrough when the outrigger pole is in the fully extended position;

a stop spacer affixed proximate the tubular section first end wherein the spring lock assembly is positioned between the stop spacer and the tubular section first end, the stop spacer engaging a cooperating telescoping tubular section first end when in a fully retracted pole position; and a plurality of eyelets attached to the outrigger pole for receiving a line therethrough and guiding the line outboard of the deck surface.

32. The outrigger apparatus according to claim 31, further comprising mounting means, which mounting means comprise:

a mounting base for mounting to the deck surface and for receiving an outrigger pole holder, the mounting base comprising:

a base plate having an aperture for receiving the pole holder therethrough;

a mounting base sleeve having an open proximal end integrally formed with the base plate for receiving an outrigger pole holder within the sleeve through the base plate aperture;

a socket affixed to the sleeve distal end for receiving a nut therein, the socket having a multi faceted bore wall for limiting rotation of the nut; and mounting means for mounting the base plate to the boat deck surface; and an outrigger pole holder carried by the mounting base for positioning an outrigger pole therein, the outrigger pole holder comprising:

an arcuate tube rotatably journaled within the mounting base sleeve, the arcuate tube having an upper end portion extending outward of the sleeve for receiving an outrigger pole therein; and a lower end portion of the arcuate tube having a nut for removably coupling with the mounting base socket.

33. The outrigger apparatus according to claim 32, wherein a longitudinal axis of the mounting base sleeve forms an acute angle with an imaginary plane including the base plate.

34. The outrigger apparatus according to claim 32, wherein the arcuate tube of the outrigger pole holder comprises an angle bend between the arcuate tube upper end portion and the lower end portion.

35. The outrigger apparatus according to claim 31, wherein the plurality of elongated tubular sections comprises:

a lower tubular section having open ends;

an intermediate tubular section having open ends, the intermediate tubular section slidable engaged within the lower tubular section; and an upper tubular section slidably engaged within the intermediate tubular section, the upper tubular section having a lower open end and an end cap affixed to its uppermost end, and wherein the tubular sections provide fluid access within the sections through the lower tubular section open end for rinsing internal surfaces therein.

36. The outrigger apparatus according to claim 31, wherein the spring lock assembly comprises a hair pin styled spring, the locking button attached to one spring leg and an opposing second spring leg biasingly engaging an inside wall portion of the elongated tubular section first end, the inside wall portion opposing the first hole.

37. The outrigger apparatus according to claim 36, further comprising a bung carried within each end of the tubular sections having the spring assembly, the bung having a bore therethrough for receiving a hinge portion of the hair pin styled spring, the hair pin styled spring engagable within the bore for limiting outward biasing of the spring legs.

38. The outrigger according to claim 31, wherein the stop assembly comprises:
   a stop sleeve carried on an outside tubular wall surface of the tubular section first ends, except the section having the largest cross-section; and
   a tubular stop bushing affixed to the tubular section second ends, the stop bushing extending into the tubular section second end for engaging the stop sleeve when the outrigger pole is in the fully extended position, the stop sleeve and stop bushing having length dimensions for positioning the locking button for engaging the tubular section second hole for locking the outrigger pole in the fully extended position.

39. The outrigger apparatus according to claim 38, further comprising a guide ring affixed to the second end of each tubular section carrying the stop bushing, the guide ring securing the stop bushing to the tubular section.

40. The outrigger according to claim 39, further comprising an eyebolt secured to the guide ring, the eyebolt having a shaft portion for securing the eyebolt to the guide ring and a circular portion for providing the eyelet.

41. The outrigger according to claim 38, wherein the stop sleeve has a hole cooperating with the tubular section first hole for receiving the locking button therethrough.

42. The outrigger apparatus according to claim 31, wherein the stop spacer is affixed within the tubular section and wherein the stop spacer includes a bore therethrough.

43. The outrigger according to claim 31, further comprising eye bolts fastened to the second end of each tubular section, the eye bolts having a shaft portion for attaching the eyebolt to the tubular section and a circular end portion for providing the eyelets.

44. A sport fishing boat outrigger apparatus for mounting to a deck surface of the boat and for extending fishing lines outwardly from the boat, the outrigger apparatus comprising:
   a mounting base for mounting to the deck surface and for receiving an outrigger pole holder, the mounting base comprising:
      a base plate having an aperture for receiving the pole holder therethrough;
      a mounting base sleeve having an open proximal end integrally formed with the base plate for receiving an outrigger pole holder within the sleeve through the base plate aperture; and
      a socket affixed to the sleeve distal end for receiving a nut therein, the socket having a multi faceted bore wall for limiting rotation of the nut; and
   an outrigger pole holder carried by the mounting base for positioning an outrigger pole therein, the outrigger pole holder comprising:
      an arcuate tube rotatably journaled within the mounting base sleeve, the arcuate tube having an upper end portion extending outward of the sleeve for receiving an outrigger pole therein; and
      a lower end portion of the arcuate tube having a nut for removably coupling with the mounting base socket.

45. The outrigger apparatus according to claim 44, further comprising an outrigger pole carried by the outrigger pole holder, the outrigger pole having a plurality of eyelets attached thereto for receiving a line therethrough and guiding the line outboard of the deck surface.

46. The outrigger apparatus according to claim 44, further comprising mounting means for mounting the base plate to the boat deck surface.

47. A sport fishing boat outrigger apparatus for mounting to a deck surface of the boat and for extending fishing lines outwardly from the boat, the outrigger apparatus comprising:
   a plurality of elongated tubular sections of successfully smaller cross-section telescopingly joined to form an outrigger pole, which outrigger pole is movable between a retracted position and a fully extended position;
   a spring lock assembly carried within a first end of each elongated tubular section except the section having the largest cross-section, each elongated tubular section first end having a first hole for receiving a locking button therethrough, the spring lock assembly having a locking button biased radially outward through the first hole within the elongated tubular section first end, each elongated tubular section having a second hole positioned within a second end of each elongated tubular section except the section having the smallest cross-section, the second hole receiving the locking button therethrough when the outrigger pole is in the extended position;
   a stop assembly carried by the first end of each elongated tubular section, except the section having the largest cross-section, the stop assembly cooperating with the spring lock assembly for limiting the extended position such that the second hole within each of the elongated tubular sections is positioned for receiving the locking button therethrough when the outrigger pole is in the fully extended position wherein the stop assembly includes a stop sleeve carried on an outside tubular wall surface of the tubular section first ends, except the section having the largest cross-section and a tubular stop bushing affixed to the tubular section second ends, the stop bushing extending into the tubular section second end for engaging the stop sleeve when the outrigger pole is in the fully extended position, the stop sleeve and stop bushing having length dimensions for positioning the locking button for engaging the tubular section second hole for locking the outrigger pole in the fully extended position; and
   a plurality of eyelets attached to the outrigger pole for receiving a line therethrough and guiding the line outboard of the deck surface.

48. The outrigger apparatus according to claim 47, further comprising outrigger pole mounting means for mounting the outrigger apparatus to the deck surface of the boat.

49. The outrigger apparatus according to claim 48, wherein the mounting means comprises:
   a mounting base for mounting to the deck surface and for receiving an outrigger pole holder, the mounting base comprising;
   a base plate having an aperture for receiving the pole holder therethrough;
   a mounting base sleeve having an open proximal end integrally formed with the base plate for receiving an outrigger pole holder within the sleeve through the base plate aperture;
   a socket affixed to the sleeve distal end for receiving a nut therein, the socket having a multi faceted bore wall for limiting rotation of the nut; and
   mounting means for mounting the base plate to the boat deck surface; and
   an outrigger pole holder carried by the mounting base for positioning an elongated tubular section therein, the outrigger pole holder comprising:

an arcuate tube rotatably journaled within the mounting base sleeve, the arcuate tube having an upper end portion extending outward of the sleeve for receiving the elongated tubular section therein; and a lower end portion of the arcuate tube having a nut for removably coupling with the mounting base socket.

50. The outrigger apparatus according to claim 47, further comprising a guide ring affixed to the second end of each tubular section carrying the stop bushing, the guide ring securing the stop bushing to the tubular section.

51. The outrigger according to claim 50, further comprising an eyebolt secured to the guide ring, the eyebolt having a shaft portion for securing the eyebolt to the guide ring and a circular portion for providing the eyelet.

52. The outrigger according to claim 47, wherein the stop sleeve has a hole cooperating with the tubular section first hole for receiving the locking button therethrough.

53. A sport fishing boat outrigger apparatus for mounting to a deck surface of the boat and for extending fishing lines outwardly from the boat, the outrigger apparatus comprising:

a plurality of elongated tubular sections of successfully smaller cross-section telescopingly joined to form an outrigger pole, which outrigger pole is movable between a retracted position and a fully extended position;

a spring lock assembly carried within a first end of each elongated tubular section except the section having the largest cross-section, each elongated tubular section first end having a first hole for receiving a locking button therethrough, the spring lock assembly having a locking button biased radially outward through the first hole within the elongated tubular section first end, each elongated tubular section having a second hole positioned within a second end of each elongated tubular section except the section having the smallest cross-section, the second hole receiving the locking button therethrough when the outrigger pole is in the extended position, wherein the spring lock assembly comprises a hair pin styled spring, the locking button attached to one spring leg and an opposing second spring leg biasingly engaging an inside wall portion of the elongated tubular section first end, the inside wall portion opposing the first hole;

a bung carried within each end of the tubular sections having the spring assembly, the bung having a bore therethrough for receiving a hinge portion of the hair pin styled spring, the hair pin styled spring engagable within the bore for limiting outward biasing of the spring legs;

a stop assembly carried by the first end of each elongated tubular section, except the section having the largest cross-section, the stop assembly cooperating with the spring lock assembly for limiting the extended position such that the second hole within each of the elongated tubular sections is positioned for receiving the locking button therethrough when the outrigger pole is in the fully extended position; and a plurality of eyelets attached to the outrigger pole for receiving a line therethrough and guiding the line outboard of the deck surface.

* * * * *